United States Patent
Peng

(10) Patent No.: US 7,938,235 B2
(45) Date of Patent: May 10, 2011

(54) BRAKE AND MEDIA DEVICE EMPLOYING THE SAME

(75) Inventor: Yao-Che Peng, Guangdong (CN)

(73) Assignee: Hon Hai Precision Industry Co., Ltd., Tucheng Dist., New Taipei (TW)

( * ) Notice: Subject to any disclaimer, the term of this patent is extended or adjusted under 35 U.S.C. 154(b) by 1225 days.

(21) Appl. No.: 11/309,371

(22) Filed: Aug. 1, 2006

(65) Prior Publication Data

US 2007/0170022 A1   Jul. 26, 2007

(30) Foreign Application Priority Data

Jan. 20, 2006 (TW) .............................. 95102398 A

(51) Int. Cl.
*F16D 63/00* (2006.01)

(52) U.S. Cl. ................. 188/82.8; 188/82.84; 242/343.2; 242/355.1; 369/79; 720/728; 360/133

(58) Field of Classification Search ............ 188/80, 188/82.1, 82.5, 82.6, 82.8, 82.84, 68, 69, 188/1.12, 31, 60; 242/355, 355.1, 156, 156.1, 242/156.2, 422, 422.4, 343, 343.1, 343.2, 242/338.1, 338.2; 360/74.1, 96.3, 132, 133; 369/75.11, 79; 720/728, 732–737; 16/35 R
See application file for complete search history.

(56) References Cited

U.S. PATENT DOCUMENTS

| | | | | |
|---|---|---|---|---|
| 3,803,351 A | * | 4/1974 | Pedersen et al. ............ 174/15.4 |
| 4,135,721 A | * | 1/1979 | Camerik ........................ 369/79 |
| 4,485,465 A | * | 11/1984 | Kirschner ................... 369/77.21 |
| 4,562,563 A | * | 12/1985 | Arets et al. ...................... 369/79 |
| 4,669,686 A | * | 6/1987 | Huber et al. ................. 242/422.4 |
| 4,730,792 A | * | 3/1988 | Jang .......................... 242/355.1 |
| 4,747,564 A | * | 5/1988 | Tsubota .................... 242/355.1 |
| 4,779,153 A | * | 10/1988 | Tsubota .................... 360/96.51 |
| 4,807,061 A | * | 2/1989 | Yoon ........................ 242/355.1 |
| 4,843,501 A | * | 6/1989 | Okauchi et al. ............ 360/99.06 |
| 4,899,951 A | | 2/1990 | Okada et al. |
| 4,911,269 A | * | 3/1990 | Perl .............................. 188/1.12 |
| 5,025,437 A | * | 6/1991 | Yamashita et al. .............. 369/79 |
| 5,209,427 A | * | 5/1993 | Yamaguchi et al. ........ 242/355.1 |
| 5,347,411 A | * | 9/1994 | Choi ............................ 242/341 |
| 5,358,195 A | * | 10/1994 | Kang ......................... 242/343.1 |
| 5,388,094 A | * | 2/1995 | Park ............................. 720/710 |
| 5,398,882 A | | 3/1995 | Kim |
| 5,460,335 A | * | 10/1995 | Jin ................................ 242/355 |
| 5,465,921 A | * | 11/1995 | Cheon ....................... 242/355.1 |

(Continued)

FOREIGN PATENT DOCUMENTS

JP   2005-322347 A   * 11/2005

*Primary Examiner* — Robert A Siconolfi
*Assistant Examiner* — Mariano Sy
(74) *Attorney, Agent, or Firm* — Winston Hsu; Scott Margo

(57) ABSTRACT

A brake includes a braking portion for braking a rotatable element, a swinging portion secured with the braking portion, a resilient portion integrally formed with the swinging portion for generating a restoring force to make the braking portion contact the rotatable element, and a forced portion for being operated to counteract the restoring force and rotate the braking portion via the swinging portion. When the forced portion is acted, the resilient portion is compressed and the braking portion is driven to separate from the rotatable element, and when the forced portion is free, the resilient portion restores to drive the braking portion to contact with the rotatable element.

19 Claims, 3 Drawing Sheets

U.S. PATENT DOCUMENTS

| | | | |
|---|---|---|---|
| 5,653,397 A * | 8/1997 | Park | 242/355.1 |
| 5,716,019 A * | 2/1998 | Ahn | 242/355.1 |
| 5,725,171 A | 3/1998 | Ahn | |
| 5,730,383 A * | 3/1998 | Yang | 242/355 |
| 5,758,838 A * | 6/1998 | Weisser | 242/355.1 |
| 5,816,520 A * | 10/1998 | Yoo | 242/338.3 |
| 5,883,870 A * | 3/1999 | Akiba et al. | 720/602 |
| 6,119,823 A * | 9/2000 | Nagaoka | 188/82.84 |
| 6,536,695 B2 * | 3/2003 | Takasaka | 242/355.1 |
| 6,731,580 B1 * | 5/2004 | Sato et al. | 720/655 |
| 7,099,113 B2 * | 8/2006 | Lee et al. | 360/133 |

* cited by examiner

BRAKE AND MEDIA DEVICE EMPLOYING THE SAME

FIELD OF THE INVENTION

The present invention relates to brakes and, more particularly, to a brake employed in a media device.

DESCRIPTION OF RELATED ART

A media device, such as a video cassette recorder (VCR) or a disk player, is operated between two operational modes: a run mode and a stop mode. The run mode generally includes a playback state, a review state, a high-speed search state and etc. The stop mode commonly includes an eject state and a power off state. When the media device is shifted from the run mode to the stop mode, a brake is applied in order to rapidly stop a rotation of a medium received in the media device.

A general brake adopted in a VCR is used as an example for illustration. The VCR further includes a reel table being winded with a tape, a deck for settling the reel table and the brake. The brake includes a lever, a shaft, an operating post, a coil spring, and a friction sheet made of felt. The shaft is fixed on the deck in the VCR and inserted into the lever. One end of the lever is connected to one end of the coil spring, and another end of the lever is attached with the friction sheet. Another end of the coil spring is secured to the deck. The lever may swing about the shaft because of a restoring force of the coil spring. The operating post is detachably inserted into a hole defined in the lever for confining a swing motion of the lever. The friction sheet follows the swing motion of the lever so that it can contact or separate from a periphery of the reel table. The reel table with a tape winded thereon can thus be shifted into a releasing state or a braking state.

However, the brake is inconvenient to be assembled into the VCR because connections among the coil spring, the deck and the lever are somewhat complicated and time-consuming. In addition, the operating post needs to be inserted into the hole defined in the lever, normal manufacturing tolerances can cause an adverse effect on a fit between the operating post and the hole. This further causes relatively low reliability of the VCR.

Therefore, a brake with a simple structure and high reliability and a media device employing the same are desired.

SUMMARY OF THE INVENTION

A brake includes a braking portion for braking a rotatable element, a swinging portion secured with the braking portion, a resilient portion integrally formed with the swinging portion for generating a restoring force to make the braking portion contact the rotatable element, and a forced portion for being operated to counteract the restoring force and rotate the braking portion via the swinging portion. When the forced portion is acted, the resilient portion is compressed and the braking portion is driven to separate from the rotatable element, and when the forced portion is free, the resilient portion restores to drive the braking portion to contact with the rotatable element.

Other advantages and novel features will become more apparent from the following detailed description of preferred embodiments when taken in conjunction with the accompanying drawings, in which:

DETAILED DESCRIPTION OF THE INVENTION

Media devices can be disk players, video cassette recorders, and other apparatuses. In the following embodiments, a disk player is used as an example for illustration.

Figure 1:
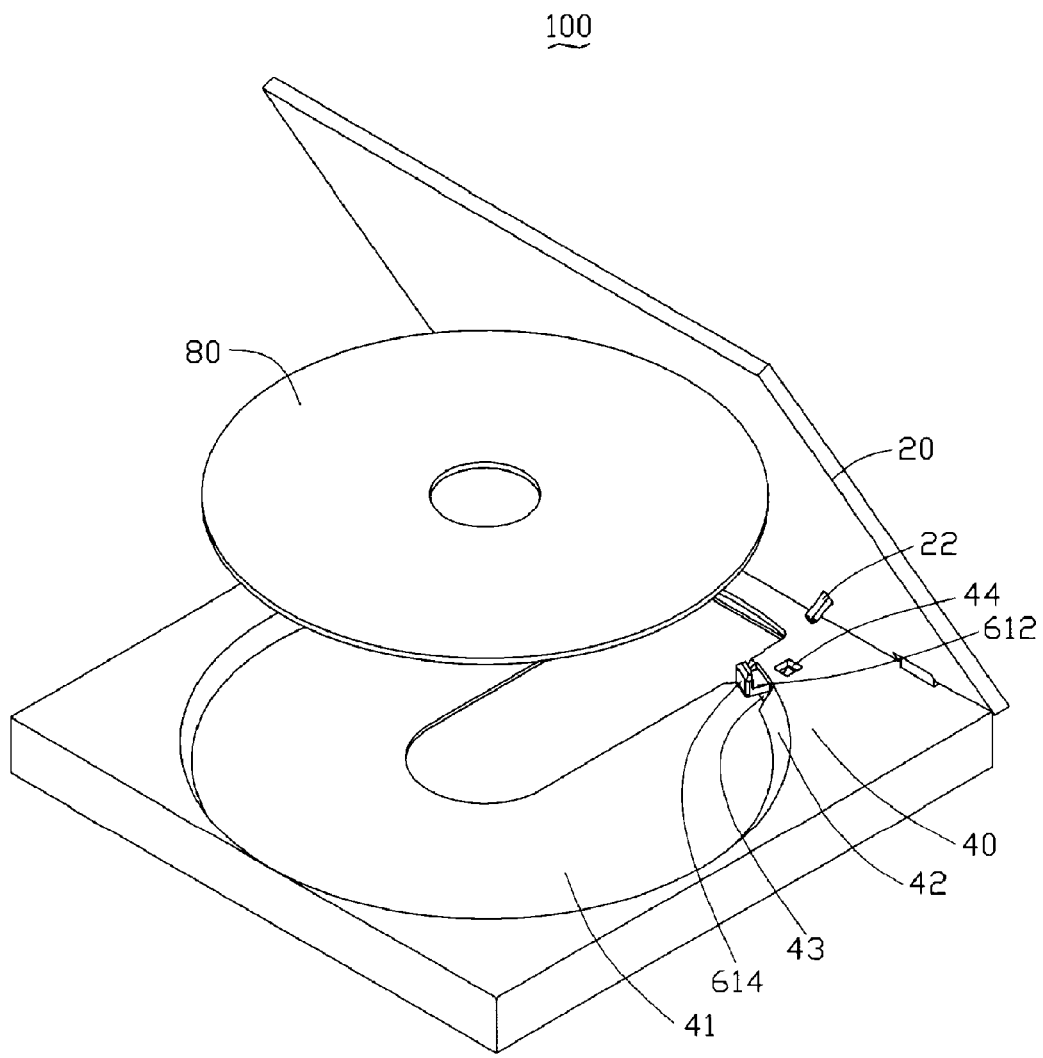
FIG. 1 is an isometric view of a disk player in accordance with an exemplary embodiment, with a disk brake being accommodated therein.
Figure 2:
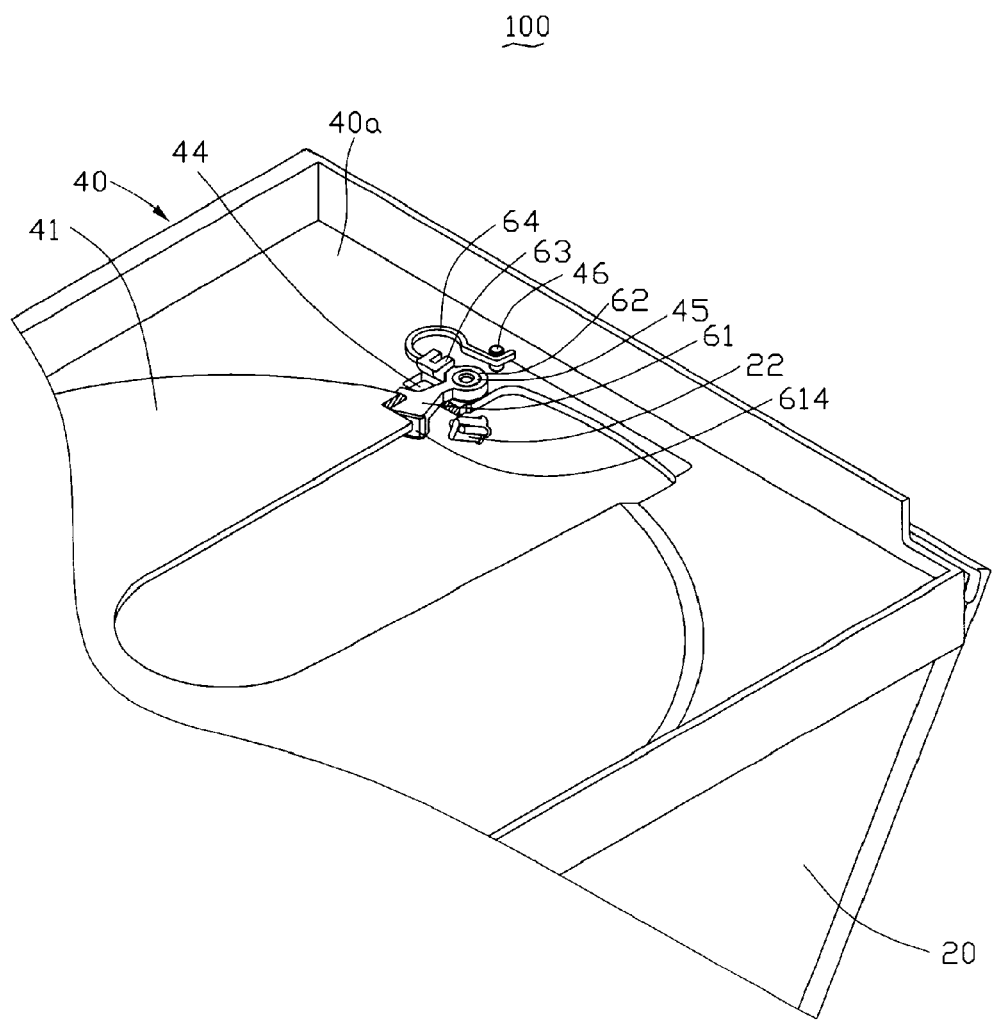
FIG. 2 is a reversed, isometric view of the disk player of FIG. 1, with a substrate plate being removed.
Figure 3:
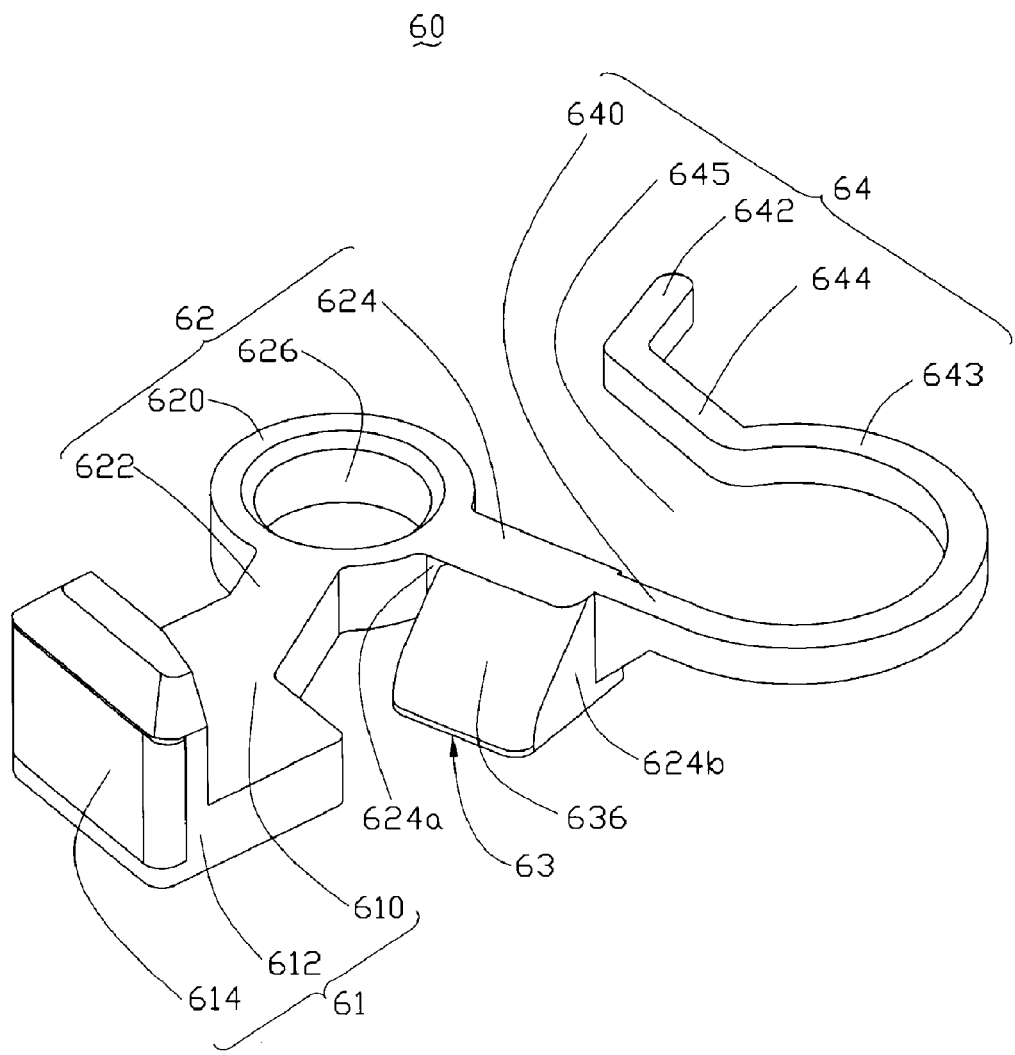
FIG. 3 is an isometric view of the disk brake of FIG. 1.

Referring to FIGS. 1 to 3, a disk player 100 includes a lid 20, a housing 40, and a brake 60. The lid 20 is pivotally coupled to the housing 40. A post 22 protrudes from an underside of the lid 20 towards the housing 40. The housing 40 defines a recess 41 for loading a disk 80 therein. The recess 41 is enclosed by a sidewall 42. A side hole 43 is defined in the sidewall 42. A top hole 44 is defined in the housing 40, and adjacent to the side hole 43. The top hole 44 corresponds to the post 22 so that the post 22 is capable of inserting therethrough. The housing 40 further includes an underside 40*a*. A pivot 45 and a pin 46 protrude from the underside 40*a*. The pivot 45 is spaced apart from the pin 46, and is closer to the recess 41 than the pin 46.

Referring to FIG. 3 again, the brake 60 is made of a plastic material and includes a braking portion 61, a swinging portion 62, a forced portion 63, and a resilient portion 64. The braking portion 61 passes through the side hole 43 for stopping the disk 80. The swinging portion 62 is secured to the braking portion 61. The forced portion 63 engages with the post 22. The resilient portion 64 is integrally formed with the swinging portion 62 for providing a restoring force to make the braking portion 61 contact an edge of the disk 80.

The braking portion 61 is substantially L-shaped and includes a first side 610 connected to the swinging portion 62 and an opposite second side 612. The second side 612 is extendable from the side hole 43 and enters the recess 41. A friction sheet 614 is attached to the second side 612 and faces a center of the recess 41. The friction sheet 614 is made of rubber or fiber materials for generating friction when it is in contact with the edge of the disk 80.

The swinging portion 62 includes a cylindrical sleeve 620 for pivotally engaging with the pivot 45, a first arm 622 connected to the first side 610 of the braking portion 61, and a second arm 624. The first arm 622 and the second arm 624 extend out from a periphery of the cylindrical sleeve 620. An angle between the first arm 622 and the second arm 624 is less than 90 degrees. The second arm 624 includes a side 624*a* and a distal end 624*b*. The side 624*a* faces the braking portion 61. A setting hole 626 is defined through the cylindrical sleeve 620 for accommodating the pivot 45 therein.

The forced portion 63 is a ramp-shaped protrusion and extends out from the side 624*a* of the second arm 624. The forced portion 63 includes an inclined surface 636 corresponding to the post 22.

The resilient portion 64 is a crooked resilient cantilever, and includes a fixed end 640 connecting to the distal end 624*b* of the second arm 624, a free end 642 for blocking the pin 46, a deforming subportion 643 for providing a restoring force, and a sliding subportion 644 for slidably engaging with the pin 46. The sliding subportion 644 interconnects the deforming subportion 643 and the free end 642. The deforming subportion 643 extends from the fixed end 640 and forms a substantially C-shaped arm with an opening 645. The sliding subportion 644 is bent at a position of where it connects the deforming subportion 643, and departs from the opening 645. The free end 642 is bent at a position where it contacts the sliding subportion 644, and further departs from the opening 645.

In assembly, the braking portion 61 passes through the side hole 43. The friction sheet 614 attached on the second side 612 of the braking portion 61 faces the center of the recess 21. The pivot 45 is engagably inserted into the cylindrical sleeve 620 of the swinging portion 62. The inclined surface 636 of the forced portion 63 faces the top hole 44. The sliding subportion 644 of the resilient portion 64 engages with the pin 46. A motion of the sliding subportion 644 with respect to the pin 46 is restricted between the free end 642 and the deforming subportion 643.

In use, the post 22 rotates in accordance with the opening or closing of the lid 20 and shifts the brake 60 into a disk braked state or a disk released state. In detail, when the lid 20 is closed, the deforming subportion 643 is deformed, the sliding subportion 644 slides about the pin 46, and then the swinging portion 62 rotates counterclockwise around the pivot 45. The braking portion 61 follows the rotation of the swinging portion 62 and withdraws inside of the housing 40. Resulting in the friction sheet 614 of the braking portion 61 separating from the edge of the disk 80 that is loaded in the recess 41 thus, release the disk 80.

On the other hand, when the lid 20 is opened, the post 22 exits through the top hole 44 and departs from the inclined surface 636 of the forced portion 63 loosening the resilient portion 64. A restoring force on the deforming subportion 643 pushes the swinging portion 62 to rotate clockwise around the pivot 45. The braking portion 61 follows the rotation of the swinging portion 62 and extends out of the housing 40 contacting the edge of the disk 80, thus generating friction between the friction sheet 614 and the edge of the disk 80.

The resilient portion 64 is made of plastic materials and formed integrally with the swinging portion 62. The brake 60 is simplified, and furthermore, it is convenient to be assembled into the disk player 100. Moreover, the forced portion 63 is a ramp protrusion corresponding to the post 22 so that high reliability of the engagement of the post 22 with the forced portion 63 can be achieved even if there are avoidless normal manufacturing tolerances.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A brake, comprising:
   a braking portion for braking a rotatable element, wherein the braking portion comprises a first side and an opposite second side, a friction sheet is attached to the second side for providing a friction to the rotatable element;
   a swinging portion secured with the first side of the braking portion;
   a resilient portion integrally formed with the swinging portion for generating a restoring force to make the braking portion contact the rotatable element; and
   a forced portion configured for being forced to counteract the restoring force and rotate the braking portion via the swinging portion, wherein when the forced portion is acted on by an action for braking the rotatable element, the resilient portion is compressed and the braking portion is driven to separate from the rotatable element, and wherein when the forced portion is free of the action for braking the rotatable element, the resilient portion restores to drive the braking portion to contact with the rotatable element.

2. The brake as claimed in claim 1, wherein the swinging portion comprises a cylindrical sleeve, a first arm connected to the first side and a second arm connected to the forced portion, the first arm and the second arm respectively extend out from a periphery of the cylindrical sleeve.

3. The brake as claimed in claim 2, wherein an angle defined between the first arm and the second arm is less than 90 degrees.

4. The brake as claimed in claim 2, wherein the forced portion is a protrusion with an inclined surface and extends out from a side of the second arm.

5. The brake as claimed in claim 2, wherein the resilient portion is configured as a crooked resilient cantilever, and sequentially comprises a fixed end, a deforming subportion, a sliding subportion and a free end, the fixed end integrally connects to a distal end of the second arm, the sliding subportion interconnects the deforming subportion and the free end.

6. The brake as claimed in claim 5, wherein the deforming subportion is configured as a substantially C-shaped arm with an opening, the sliding subportion is bent at a position where the sliding subportion connects the deforming subportion and departs from the opening, the free end is bent at a position where the free end connects the sliding subportion and also departs from the opening.

7. A media device, comprising:
   a housing defining a recess for loading a rotatable medium, a top hole, and a side hole therein, the recess being enclosed by a sidewall, the side hole being defined in the sidewall, the top hole being adjacent to the side hole;
   a lid pivotally coupled to the housing, the lid comprising a post protruding from the lid towards the housing, the post being capable of inserting into the top hole; and
   a brake comprising:
      a braking portion passing through the side hole for braking the rotatable medium;
      a swinging portion secured with the braking portion;
      a resilient portion integrally formed with the swinging portion for generating a restoring force to make the braking portion contact the rotatable medium; and
      a forced portion configured for being operated to counteract the restoring force and rotate the braking portion via the swinging portion, when the forced portion being acted on by an action of inserting the post into the top hole, the resilient portion being compressed and the braking portion separating from the rotatable medium, when the forced portion being free of the action of inserting the post into the top hole, the resilient portion restoring and the braking portion being in contact with the rotatable medium.

8. The media device as claimed in claim 7, wherein the braking portion comprises a first side and an opposite second side, the first side is secured to the swinging portion, the second side is extendable from the side hole, a friction sheet is attached to the second side for providing a friction to the rotatable medium.

9. The media device as claimed in claim 8, wherein the swinging portion comprises a cylindrical sleeve, a first arm connected to the first side and a second arm connected to the forced portion, the first arm and the second arm respectively extend out from a periphery of the cylindrical sleeve.

10. The media device as claimed in claim 9, wherein an angle defined between the first arm and the second arm is less than 90 degrees.

11. The media device as claimed in claim 9, wherein the forced portion is a protrusion with an inclined surface and extends out from a side of the second arm, the forced portion is under the top hole and is capable of being forced by the post.

12. The media device as claimed in claim 9, wherein the resilient portion is configured as a crooked resilient cantilever, and sequentially comprises a fixed end, a deforming subportion, a sliding subportion and a free end, the fixed end integrally connects to a distal end of the second arm, the sliding subportion interconnects the deforming subportion and the free end.

13. The media device as claimed in claim 12, wherein the deforming subportion is configured as a substantially C-shaped arm with an opening.

14. The media device as claimed in claim 13, wherein the sliding subportion is bent at a position where the sliding subportion connects the deforming subportion and departs from the opening, the free end is sequentially bent at a position where the free end connects the sliding subportion and also departs from the opening.

15. The media device as claimed in claim 14, wherein a pin protrudes from an underside of the housing and is adjacent to the top hole, the sliding subportion engages with the pin and is restricted between the deforming subportion and the free end.

16. The media device as claimed in claim 15, wherein a pivot protrudes from the underside of the housing and is inserted in the cylindrical sleeve for the cylindrical sleeve rotating around the pivot.

17. The media device as claimed in claim 16, wherein the pivot is spaced apart from the pin, and is closer to the recess than the pin.

18. A media device, comprising:
a housing having a medium receiving portion configured for receiving a medium therein;
a lid coupled to the housing, the lid being pivotable to a closed position for closing the medium receiving portion, and pivotable to an opened position for opening the medium receiving portion, the lid including a protrusion extending toward the housing; and
a brake received in the housing, the brake integrally forming a braking portion and a resilient portion, wherein when the resilient portion is pressed by the protrusion as the lid pivots to the closed position, the resilient portion is deformed and the braking portion is driven to move in a manner so as to allow the medium to rotate, and when the protrusion disengages from the resilient portion as the lid pivots to the opened position, the resilient portion returns toward its original state to drive the braking portion to move in a manner so as to brake the medium from rotating.

19. The media device of claim 18, wherein the resilient portion has a substantially C-shaped configuration.

* * * * *